United States Patent [19]

Stump et al.

[11] 4,124,435

[45] Nov. 7, 1978

[54] LABEL CUTTING HEAD

[75] Inventors: C. Roscoe Stump, Sidney; John F. Van Dam, Jr., Fairfield, both of Ohio

[73] Assignee: Bell & Howell Company, Chicago, Ill.

[21] Appl. No.: 862,137

[22] Filed: Dec. 19, 1977

[51] Int. Cl.[2] .............................................. B32B 31/00
[52] U.S. Cl. ...................................................... 156/521
[58] Field of Search ......................................... 156/521

[56] References Cited

U.S. PATENT DOCUMENTS 3,713,948 1/1973 Kluger ................................ 156/521
3,856,604 12/1974 Lukkarinen .......................... 156/521

*Primary Examiner*—Douglas J. Drummond
*Attorney, Agent, or Firm*—Harry G. Thibault; Alan B. Samlan

[57] ABSTRACT

A device for cutting labels from a printed sheet of web material, such as paper, containing rows and columns of names and addresses. The device is easily adjustable to cut labels of varying heights, without requiring the physical replacement of multiple sets of gears. This is accomplished by using a unique variable eccentric linkage for driving a single pawl and ratchet drive means to feed the paper. Additionally, the device is capable of being adjusted to cut labels of different lengths, depending on whether the printed sheet contains 3, 4 or 5 columns of names and addresses. To this end, a readily adjustable gear-change transmission in the main guillotine blade power train varies the cutting cycle of the guillotine blade to be in phase with a constant speed rotary knife blade. The length and width of the rotary knife blade is varied to cut labels of different lengths and heights.

6 Claims, 10 Drawing Figures

LABEL CUTTING HEAD

BACKGROUND OF THE INVENTION

In the preparation of labels for mass mailings of magazines, envelopes or the like, names and addresses are printed by a computer in columns and rows on sheets of web material, such as paper, banded together and having transport holes along the side thereof. Depending upon the input to the computer and the desires of the user, the names and addresses are printed in various numbers of columns, usually 3, 4 or 5 columns to a given width of web material. In addition, the height of each name and address combination may vary depending upon whether each name and address is a 3, 4, 5 or 6 line combination, or more. Thus, labeling devices or heads, and in particular those devices providing a feed mechanism for a sheet of web material from which labels are produced, have not, to date, been capable of easy adjustment to cut labels of varying lengths and heights. Heretofore, major gear change operations were required to change a label head to cut labels of varying sizes, during which considerable production time was lost due to machine down time.

Prior apparatus of the type to which the present invention relates use pin wheel feed means to drive a computer-produced list band of names and addresses through a guillotine cutting blade which cuts a single row containing a multiple number of names and addresses to a given height. In such machines, the guillotine is driven by a power train through a set of gears which operate the guillotine through a given time cycle proportional to the paper feed speed to produce labels of a desired height. As the paper is fed forward, trimmers are also provided to remove the perforations at the edges of the web. The strip of paper cut by the guillotine is ultimately fed laterally to a rotary blade which cuts the strip into 3, 4 or 5 separate labels, depending on the number of columns appearing on the web. Next, each label is carried to a glue-applying head and application station where the label is applied to a mailing piece.

Machines of the type described which are currently available are constructed to produce labels of varying heights and lengths, but the change-over from one mode of operation to another requires complex mechanical drive trains and gear reduction changes. For example, complicated gear speed reduction changes must be made to change the speed ratio between the guillotine blade and rotary blade when changing from a 3, 4 or 5 column operation. In most machines, this requires the actual removal and replacement of gears in the guillotine power train. Also, by way of example, the web feed speed in most prior devices can only be adjusted to provide labels of different heights by means of complex mechanical alterations to the web feed power train. In some installations, a different label head must be used for each label height requirement, which obviously increases the cost of the mailing operation.

Therefore, it is a primary object of the present invention to provide a label-producing head which can easily and economically produce labels of varying heights and lengths without requiring the operator to make complex mechanical alterations to the machine when changing from one label size to another.

Another object of the present invention is to provide a label head having the capability of enabling the operator to change the web feed speed by making a single, simple mechanical movement change.

An additional object of the present invention is to provide a label head wherein the relative speed of a guillotine blade and a rotary cutting blade can be altered by a simple mechanical operation which does not require disassembly of the head, whereby labels of different lengths are produced.

Still another object of the present invention is to provide a label cutting head having a ratchet and pawl power drive for a web paper feed system, wherein the throw of the ratchet and pawl power drive, and consequentially the incremental movement of the web, can be varied by a single, simple mechanical operation.

Yet another object of the present invention is to provide an easily manipulated operator-controlled variable gear reduction system for driving a guillotine blade in a label cutting head to produce labels of varying lengths.

These and other objects of the present invention will become apparent from the following description of the preferred embodiment, when read in conjunction with the accompanying drawings wherein.

Figure 1:
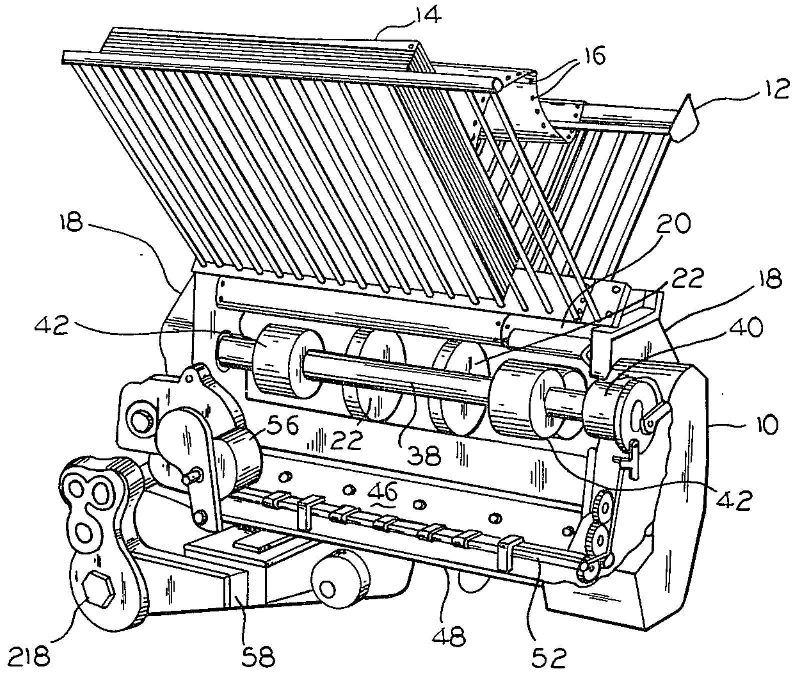
FIG. 1 is a perspective, partially cut away view of a label cutting head incorporating the elements of the disclosed invention.

Referring to FIG. 1, the label head of the present invention includes a housing 10 having a rack 12 mounted thereon to support a web or band of paper 14. The web 14 is preferably a computer produced band of paper having columns and rows of names and addresses printed thereon, and equidistant perforations 16 on either side of the web. Rack 12 is mounted on a pair of brackets 18 which are part of housing 10, whereby a space 20 is provided between the rack 12 and housing 10.

Figure 2:
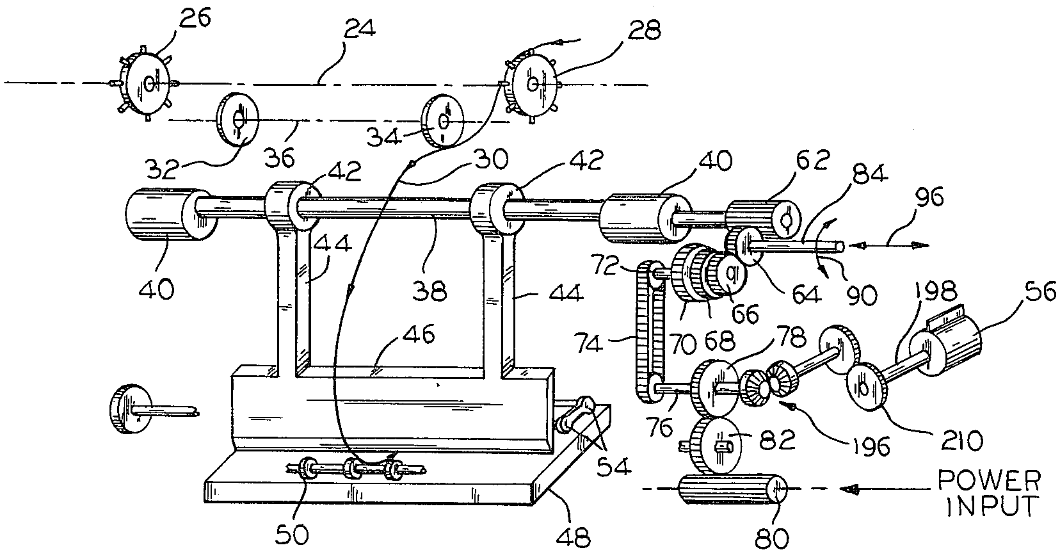
FIG. 2 is a schematic view of the guillotine blade power train, rotary blade power train, and web feed system of the label head of FIG. 1.

Disposed adjacent space 20 are a pair of web drive rollers 22 which assist in feeding the paper through the head in a manner to be described. Referring to FIG. 2, a shaft designated by the center line 24 is mounted for rotation in housing 10, and has two pin wheels 26, 28 mounted thereon for rotation with shaft 24. Shaft 24 is mounted in housing 10 behind idler rollers 22 and beneath rack 12, as viewed in FIG. 1. Pin feed wheels 26, 28 are spaced apart a distance equal to the spacing between the perforated edges 16 on web 14, whereby the pins on the wheels 26, 28 engage the perforations 16 to advance the web 14 in a path designated by the arrow 30 in FIGS. 2, 3. A pair of rotary trimmer blades 32, 34 are mounted on a shaft 36, and are located adjacent the web path 30 to trim the perforations 16 off of web 14 as the web is advanced.

A shaft 38 is mounted in housing 10 for eccentric rotation on a pair of bearing blocks 40. Journaled for rotation on shaft 38 are a pair of bearing assemblies 42 connected by link arms 44 to a guillotine cutting blade 46. Rotation of shaft 38 will impart vertical reciprocating motion to guillotine blade 46 relative to platent 48 which forms a part of housing 10, in a manner to be described.

Figure 3:
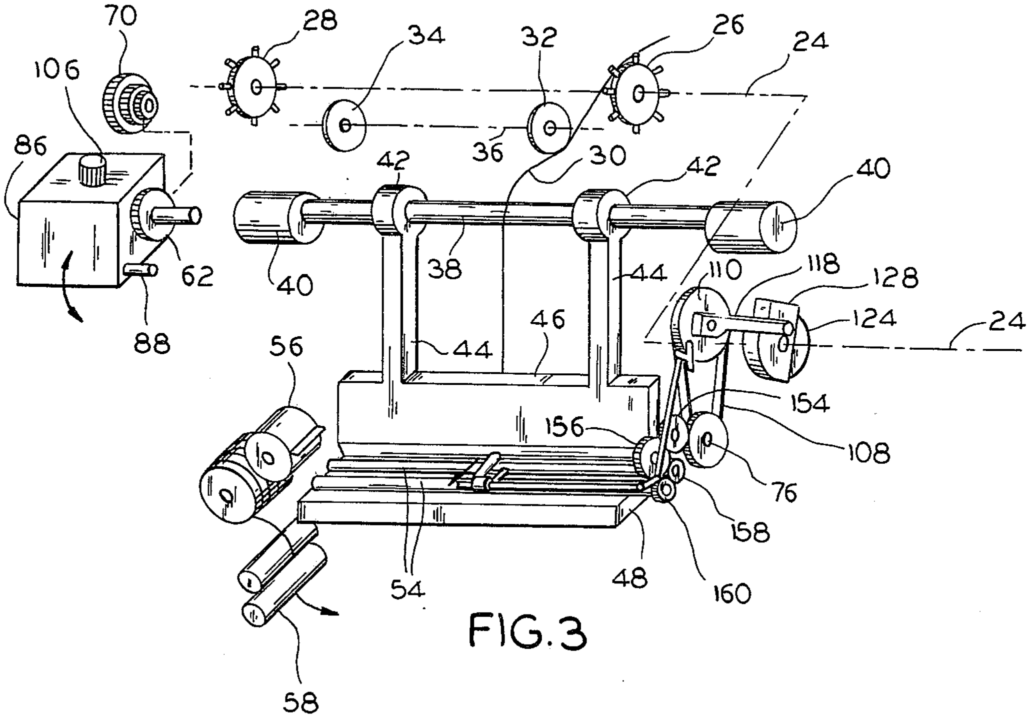
FIG. 3 is a schematic diagram of the present invention illustrating the opposite side of the machine shown in FIG. 2, and showing the operation of the guillotine blade variable gear reduction system to the left and the variable throw pawl and ratchet web feed mechanism to the right.
Figure 8:
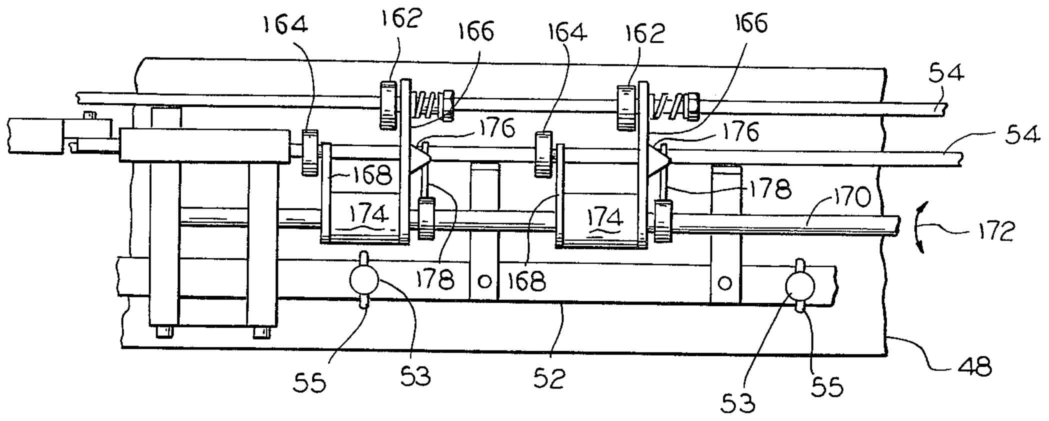
FIG. 8 is a detail view of the reciprocating clamp means on the bed of the label head which ensure that the strip of labels cut by the guillotine are properly fed to the rotary cutter blade.

The front of platen 48, as viewed in FIGS. 1 and 3 includes roller means 50, 54 for driving a sheared strip of web 14 into position against a movable stop member 52 (FIG. 8). Stop member 52 is movably connected to platen 48 by a pair of spring loaded clamps 53 which extend into slots 55. Adjacent the left end of platen 48, as viewed in FIG. 3, is a rotary blade assembly 56 which is adapted to laterally remove the strip of web material from the edge of platen 48, cut the web strip into the desired number of labels, and deliver the web to the gluing station, designated generally by the number 58 (FIGS. 1, 3), in a manner to be described in greater detail.

To drive the reciprocating guillotine blade 46, a shaft 60 (FIGS. 2, 3) is connected to one of the bearing blocks 40 as it extends through housing 10. An elongated gear 62 is fixed to the end of shaft 60, as is adapted to mesh with laterally movable pinion gear 64. Gear 64 is moveable into selective engagement with one of the plurality of gang-mounted gears 66, 68, 70 in a manner to be described. Gang gears 66, 68, 70 are mounted on a shaft 72 which is connected by a chain drive 74 to a shaft 76 on which a gear 78 is mounted. Gear 78 is driven from the main power drive shaft 80 through an intermediate gear 82.

The power to drive rotary blade assembly 56 is also taken directly from main power shaft 80 (FIG. 2) through a bevel gear 84 mounted on shaft 76, which mates with bevel gear 86 to drive gears 88, 90. Gear 90 is connected directly to rotary blade assembly 56 by means of shaft 92. As is apparent from FIG. 2, rotary blade assembly 56 in the preferred embodiment is driven at a constant speed at all times, irrespective of the size of the label to be cut by the label head.

Figure 10:
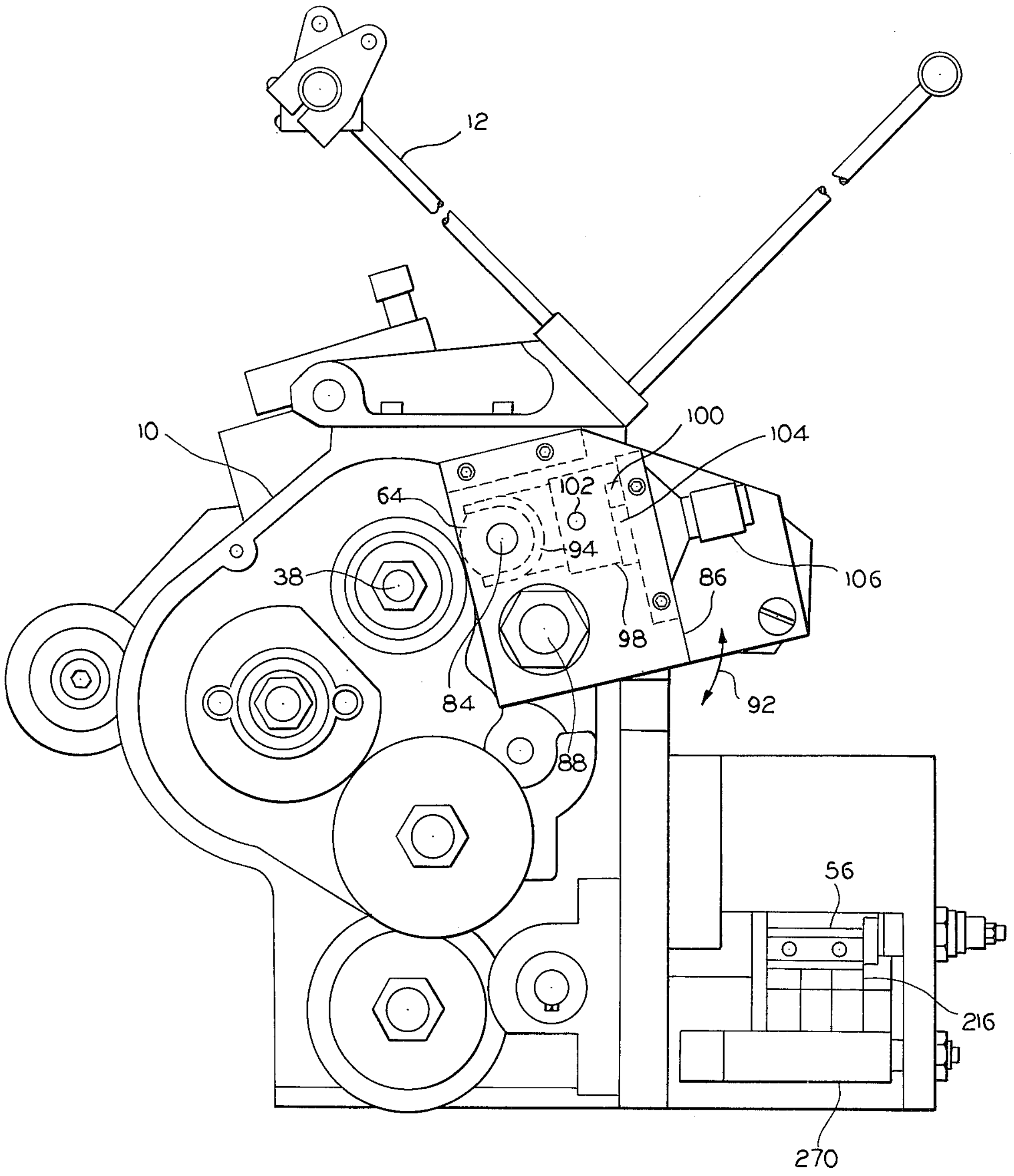
FIG. 10 is a side view of the label cutting head of FIG. 1.

Pinion gear 64 and gang gears 66, 68, 70 are adapted to provide a readily accessible and easy means to change the speed of shaft 38, and thereby change the timing of the reciprocal movement of guillotine blade 46. To this end, pinion gear 64 is mounted on a shaft 84. Shaft 84 is mounted in a rectangular box-like sub-assembly 86 (FIG. 3), and the entire assembly 86 is mounted for limited rotative movement on shaft 88 (FIGS. 3, 10). Shaft 88 extends from and is fixed to housing 10.

Pinion gear 64 is adapted to constantly engage elongated gear 62, and to move laterally along shaft 84 to selectively engage either gear 66, gear 68, or gear 70. Because of the different diameters of gears 66, 68 and 70, shaft 84 and gear 64 must be capable of variable movement in the direction indicated by arrow 90 in FIG. 2. This movement is provided by making box-like sub-assembly 86 rotate on shaft 88 in the direction indicated by the arrow 92 (FIG. 10) as gear 64 is shifted between gears 66, 68 and 70.

To provide lateral movement of gear 64, a yoke 94 (FIG. 10) engages gear 64 and moves the gear in the direction shown by arrow 96 in FIG. 2. Yoke 94 is attached to a linkage member 98 which contains a cam follower cavity 100 therein. Linkage member 98 is mounted on shaft 102 in sub-assembly 86, and is capable of lateral movement along shaft 102. An eccentric-shaped cam 104 is connected to an operator controlled rotary knob 106 which extends from sub-assembly 86. As knob 106 is rotated, cam 104 bears against cam following cavity 100, causing linkage member 98 to move laterally along shaft 102. This causes yoke 94 to shift gear 64 into engagement with either gear 66, 68 or 70. To allow gear 64 to freely move between these three gears during shifting, sub-assembly 86 is rotated (arrow 92) upward to prevent the gears from interferring with each other. Also, the various positions of sub-assembly 86 allow pinion gear 64 to engage gears 66, 68 and 70, each of which are of a different diameter. It is readily apparent that the speed of shaft 38, and the cycle of guillotine blade 46, can be varied depending on which of gears 66, 68 or 70 gear 64 engages.

Figure 4:
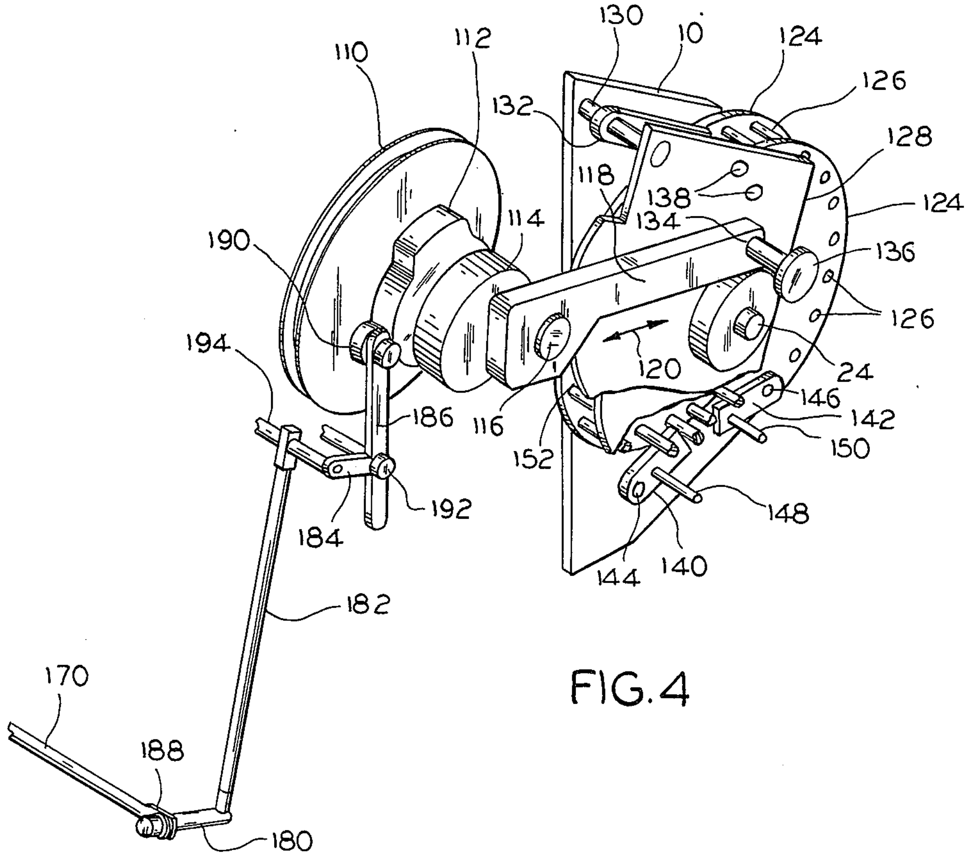
FIG. 4 is a detail view of the novel variable pawl and ratchet web feed drive which is an important feature of the present invention.

The present invention also provides a novel variable pin feed wheel drive mechanism which controls the amount of paper fed beneath guillotine blade 46 for each cut of the blade. To this end, shaft 76 (FIG. 2) extends leftwise to the opposite side of platen 48 where it drives belt 108, which in turn rotates belt sheath 110 (FIGS. 3, 4). As best shown in FIG. 4, a cam 112 and an off-center eccentric 114 are mounted for rotation with sheath 110. Pin 116 is fixed to eccentric 114, and has a linkage arm 118 mounted thereon for reciprocal motion in the direction shown by the arrow 120 (FIG. 4) as eccentric 114 is rotated.

Rigidly mounted on the end of the shaft 24 and extending through housing 10 is a ratchet wheel 122 comprising a pair of circular plates 124 and a series of equally spaced ratchet pins 126 extending therebetween. A plate 128 is rotatably mounted on shaft 24 and includes a pin 130 and a ratchet pawl 132 extending therefrom (FIG. 4). Pawl 132 is adapted to engage ratchet pins 126 and incrementally rotate shaft 24 when plate 128 is reciprocally rotated, as will be explained.

Linkage arm 118 has an aperture 134 at one end thereof, and a manually extractable, spring loaded pin 136 extends through this aperture. Plate 128 includes three apertures 138 therein, each set at a different distance from shaft 24, which is the center of rotation of plate 128. One of the apertures 138 is not shown in FIG. 4 because it is beneath the pin 134 and linkage arm 118. By extracting pin 136 from one of apertures 138 and placing the pin in another aperture, the throw, or arcuate distance of travel of pawl 132 can be changed. Thus, when eccentric 114 rotates, it reciprocally drives linkage arm 118 in the direction indicated by arrow 120 (FIG. 4). This movement is imparted by pin 136 through corresponding aperture 138 to produce a rocking motion in plate 128, which causes pawl 132 to incrementally rotate circular ratchet plates 124 and shaft 24, and consequentially, pin feed wheels 26, 28. The amount of circular movement of plate 128 varies as pin 136 is moved from one aperture 138 to another, since this causes the throw of pawl 132 to vary. When pin 138 is in the aperture 138 closest to shaft 24, pawl 132 reciprocates through its greatest distance of travel; when pin 136 is in the aperature 138 closest to the rim of plate 128, pawl 132 travels its least distance.

A pair of locking pawls 140, 142 are rotatably fixed to housing 10 by means of pins 144, 146 (FIG. 4), and are spring biased upward into engagement with ratchet pins 126. A pair of follower pins 148, 150 extend from pawls 140, 142, respectively, and are adapted to engage cam surface 152 which forms a part of plate 128. Pawl 142 prevents circular plates 124, and shaft 24, from rotating opposite to the paper feed direction when plate 128 is reciprocating in the counterclockwise portion of its cycle, as viewed in FIG. 4. Pawl 140 prevents shaft 24 from moving the paper in the feed direction until cam surface 152 moves into position where it contacts follower pin 148 and moves pawl 140 out of locking engagement with ratchet pins 126.

Means are also provided to drive the web material 14 away from guillotine blade 46 towards stop member 52 after the web has been cut into a strip by the guillotine blade. To this end, roller means 54 are disposed in platen 48 and are rotatively driven by gear means 154, 156, 158 and 160 (FIG. 3). Disposed adjacent rollers 54 are a series of nip rollers 162, 164 mounted on a series of arms 166, 168 which are attached to a shaft 170 (FIG. 8). Shaft 170 is constructed to reciprocally rotate through a short arc, as indicated by arrow 172. As shaft 170 is rotated in one direction, nip rollers 162, 164 are disengaged from roller means 54, and web material 14 will be moved only under the influence of pin feed wheels 26, 28. Thus, when the web 14 is initially fed under guillotine blade 46, in a manner to be described, rollers 162, 164 are in their uplifted position to avoid pulling the web material prior to its being sheared by the guillotine.

After the guillotine blade has cut the web 14 into a strip of labels, shaft 170 is rotated in the opposite direction to cause engagement of nip rollers 162, 164 and roller means 54. This drives the strip against stop member 52, and into position to be cut by rotary blade 56, as will be explained.

In the preferred embodiment as best disclosed in FIG. 8, arms 166, 168 are mounted on bearings 174 which surround shaft 170. Springs, or other suitable means inside bearings 174, bias arms 166, 168 towards forcing rollers 162, 164 into contact with roller means 54. Tabs 176 extend from arms 166, and engage lift fingers 178 which are fixed to shaft 170. As shaft 170 is rotated in one direction, fingers 178 move upward, contact tabs 176, and lift rollers 162, 164 out of engagement with roller means 54.

The linkage which automatically operates shaft 170 can best be understood with reference to FIG. 4, which shows a series of link arms 180, 182, 184, 186 extending between a flattened end 188 of shaft 170 and cam follower 190, the latter being in engagement with cam 112. Link arm 186 is pivotally connected to the housing 10 by means of shaft 192. Link arms 182 and 184 are connected by an intermediate shaft 194. The operation of this linkage is as follows: as cam 112 is rotated by belt 108 (FIG. 3), reciprocal movement of cam follower 190 causes link arm 186 to rotate about shaft 192. Link arm 184 pivots in a small arc, causing link arm 182 to move up or down vertically, and thus rotate shaft 170. Thus, it is apparent that the rotation of cam 112 controls the timing of the cycle whereby nip rollers 162, 164 are forced into, and removed from, engagement with roller means 54.

Located adjacent one end of platen 48 is rotary blade assembly 56 (FIG. 1) which is mounted on housing 10 for rotation about an axis which is at right angles to the direction of cut of guillotine blade 46. Blade assembly 56 is driven at a constant speed by gear train 196 extending directly between input power shaft 80 and shaft 198, which drives the blade assembly.

Figure 5:
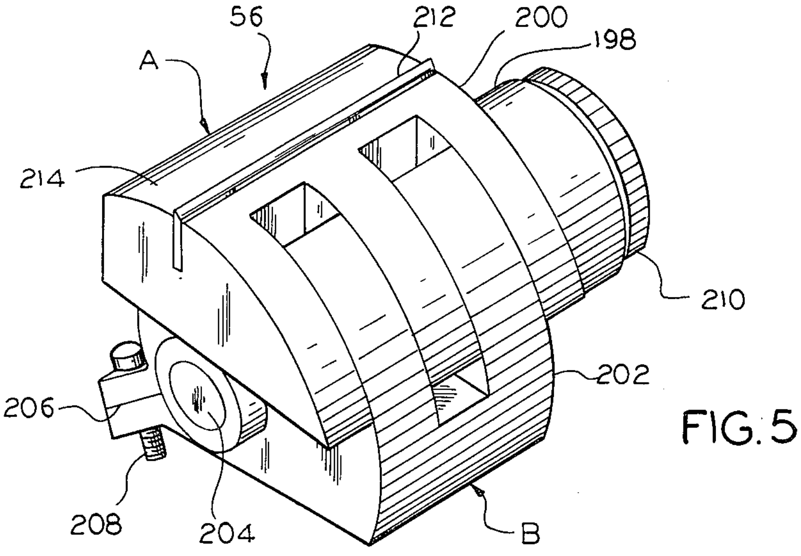
FIG. 5 is a detail perspective view of the adjustable rotary cutting blade forming part of the present invention.

Blade assembly 56 comprises two primary components which provide a means for adjusting the blade to cut labels of varying lengths. As seen in FIG. 5, the assembly consists of two interleaved segments 200, 202. A central shaft 204 is fixed to one of the segments, 200, and the other segment, 202, is rotatably mounted on the shaft 204. Segment 202 includes an adjustable mounting means comprising a split portion 206 around shaft 204, and screws 208 to provide a means to clamp segment 202 to shaft 204. The blade assembly also includes shaft 198 for mounting gear 210, through which power is delivered to drive the blade assembly (FIG. 2). A cutting blade 212 is mounted on segment 200, and extends slightly therefrom to provide a cutting action, to be described.

As will be discussed herein, the circumferential length of blade assembly 56; i.e., the distance from point A to point B (FIG. 5) over the surface of the assembly, can be varied by loosening screws 208 and rotating segment 202 relative to segment 200. The assembly also includes a surface portion 214 located behind the blade, the purpose of which will be explained.

Figure 6:
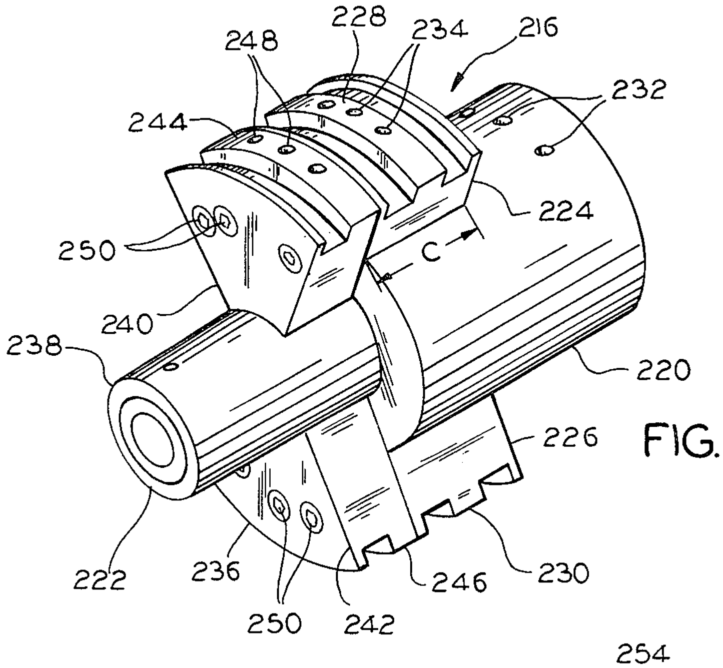
FIG. 6 is a detail perspective view of the variable vacuum head of the present invention, showing a single additional plate attached to the basic plate.

A vacuum head 216 is mounted for rotation in housing 10 beneath and slightly behind rotary blade assembly 56. This is shown schematically in FIG. 9. In FIG. 1, the vacuum head is not shown, but is inside the housing and is mounted for rotation about shaft 218. The details of the head 216 are shown in FIG. 6, and include a central hollow shaft 220 having a smaller diameter portion 222. Segments 224, 226 extend radially outward in a pie-like configuration from shaft 220, and include track-like surfaces 228, 230 at the outer circumference thereof.

A series of ports 232 are provided in shaft 220, and communicate with the hollow central portion of shaft 220. An additional series of ports 234 extends from the hollow central portion of shaft 220 to the surfaces 228, 230. Shaft 220 is journaled in housing 10 such that ports 232 rotate adjacent a vacuum chamber, whereby a vacuum is pulled at the exit of ports 234 on surfaces 228, 230.

The width C of surfaces 228, 230 is approximately equal to the height of the smallest label cut by the disclosed device. This would be the size label cut when pin 136 is inserted in the topmost aperture 138 in plate 124 (FIG. 4). The arcuate length of surfaces 228, 230 is slightly larger than the longest label produced by the disclosed device. To alter the vacuum head 216 to handle labels of greater width, a first auxiliary portion 236 is provided, and consists of a hollow shaft 238 upon which a pair of pie-like shaped segments 240, 242 extend in a radial direction and include track-like surfaces 244, 246 at the outer circumference thereof. Ports 248 extend from surfaces 244, 246 to the hollow central portion of shaft 220, and provide a vacuum at surface 244, 246 in the manner described above regarding ports 234. Segments 240, 242 are held to segments 224, 226, respectively, by means of bolts 250. The holes through which bolts 250 extend are connected to ports 248 and the vacuum chamber described previously. When only first auxiliary portion 236 is attached to the vacuum head, bolts 250 provide a dual function of attachment and of blocking the vacuum from outside air pressure.

To make the surface of vacuum head 216 even wider, a second auxiliary portion 252 (FIG. 2) is slid over shaft 238 and bolted to first auxiliary portion 236. Ports 254 extend to the center of shaft 220 through the holes through which bolts 250 extend, to provide a vacuum at the surface of portion 252, which is also tracked. Second auxiliary portion 252 is also comprised of two pie-like shaped segments 1 similar to that shown in FIG. 6.

In operation, a band of computer-produced name and address lists 14 is placed in rack 12 (FIG. 1) and the top sheet is fed over the top of the rack and threaded over pin feed wheels 26, 28 such that the pins on wheels 26, 28 engage perforations 16 on either side of the web 14 (FIG. 2). The web is then fed by means of rollers 22 adjacent rotary trimmer blades 32, 34, which trim off the edges of the web to remove the perforations 16. The web extends behind guillotine blade 46 and is fed beneath the blade and over roller means 50. As pin feed wheels 26, 28 are incrementally rotated as described above by the variable pawl and ratchet mechanism illustrated in FIG. 4, the web 14 is fed beneath guillotine blade 46 a distance equal to the desired height of the labels. The aforementioned drive trains synchronize the operation of pin feed wheels 26, 28 and the cyclic movement of blade 46 to allow one movement of blade 46 for each degree of desired movement of web 14 beneath the blade.

As guillotine blade 46 falls, it cuts a strip of labels to the precise height desired. This strip may contain three, four, or five sets of names and addresses, depending upon the program of the computer producing the address list. As the strip is cut, cam 112 actuates cam follower 10 (FIG. 4) to rotate shaft 170, which brings nip rollers 162, 164 into engagement with the strip of web material and roller means 54. This drives the strip of web material forward against stop member 52, which has been positioned by means of clamps 53 to coincide with the selected label height. Rollers 162, 164 are then raised away from roller means 54 by means of cam 112, and the assembly is ready to receive the next strip cut by guillotine blade 46.

Figure 9:
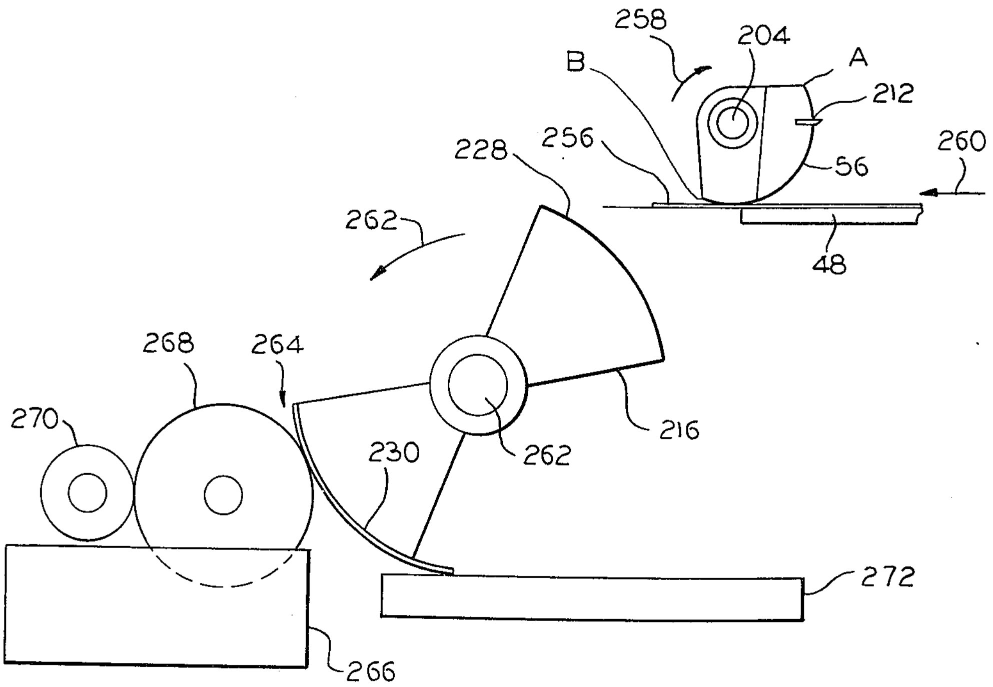
FIG. 9 is a schematic diagram illustrating how the rotary cutting blade transports a label to the vacuum head.

Referring to FIG. 9, the operation of rotary blade assembly 56 and vacuum head 216 is schematically illustrated. The right-most rotary trimmer blade 34 (FIG. 2) is positioned such that the right edge of the label strip cut by guillotine blade 46 overhangs platen 48 as the strip is moved forward against stop member 52. This overhang is designated 256 in FIG. 9. The timing of the rotation of blade assembly 56 (in the direction of arrow 258) is such that point B on the surface of the assembly captures the overhanging portion 256 of the strip in the nip between rotary blade assembly 56 and platen 48, and drives the strip in the direction indicated by arrow 260. As the blade 212 reaches the strip, it cuts the label to the proper length and simultaneously deposits the cut label on the surface 228 of vacuum head 216.

As blade assembly 56 continues to rotate, surface portion 214 behind blade 212 captures the leading edge of the remaining strip in the nip between the blade assembly and platen 48, and drives the remaining strip in the direction shown by arrow 260 a distance equal to the circumferential distance between the blade 212 and point A on the surface of blade assembly 56. The strip then overhangs platen 48, and as blade assembly 56 continues to rotate, point B again reaches the platen 48 to capture the overhanging strip in the nip between the blade assembly and platen 48, and the cutting process is repeated. The labels are deposited on surface 230 of vacuum head 216 as the vacuum head rotates about axis 262 in the direction indicated by the arrow 262.

It is thus apparent that the length of the label cut is equal to the surface distance from point B on the blade assembly to the blade 212, plus the distance of the overhang; i.e., the surface distance from blade 212 to point A on the blade assembly. Therefore, the label length is equal to the sum of these two distances, which is the entire circumferential length from point A to point B on the blade assembly. Referring to FIG. 5, this circumferential length can be easily adjusted by an operator by merely loosening screw 208 and moving interleaved segment 202 relative to segment 200 about shaft 204 until the distance between points A and B is precisely equal to the desired length of the label. This length can easily be measured by placing a flexible measuring tape over the surfaces and measuring the segments from A to B. Blade 212 does not protrude far enough from the surface of segment 200 to produce a meaningful error in this measurement.

Figure 7:
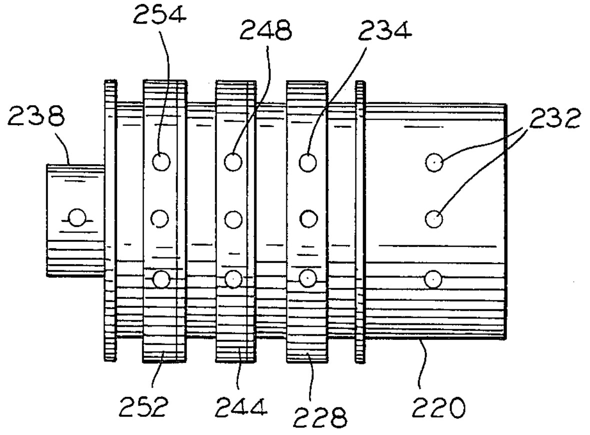
FIG. 7 is a plan view of the vacuum head of FIG. 6, showing two additional plates attached to the basic plate.

Referring again to FIG. 9, the cut labels are held to vacuum head 216 after they leave platen 48 by the vacuum created at ports 234 (FIGS. 6, 7). Higher labels are held by the vacuum formed at ports 248 and 254, depending upon the height of the label cut by guillotine blade 46.

Disposed adjacent the arc of travel of surfaces 228 and 230 of vacuum head 216 is a glue applicator station 264 comprising a glue tank 266, a glue applicator roller 268, and a wiper roller 270. As the surfaces 228, 230 approach glue station 264 with a cut label held thereto, glue is applied to the underside of the label. Application station 272 contains, by way of example, a moving series of periodicals or envelopes upon which the labels are to be applied. As the glued underside of the label contacts the periodical or envelope, it adheres thereto and the vacuum force holding the label to either surface 228 or 230 is broken.

The above-described label head is capable of being easily adjusted to provide labels of different heightsby making three simple operator-controlled adjustments. First, referring to FIG. 4, by merely pulling on pin 136 and moving it to another of the apertures 138, the throw of ratchet pawl 132 is varied. This in turn varies the incremental distance that shaft 24 and pin feed wheels 26, 28 advance web 14 beneath guillotine blade 46 during each stroke of the blade.

Second, by adding a single or double segment to vacuum head 216, surfaces 228 and 230 thereof (FIGS. 6, 7) can be widened to accommodate labels of the selected height. Third, stop member 52 is moved backward or forward on platen 48 to provide a proper stopping point for the label strip after it is cut by guillotine blade 46 and moved ahead by roller means 54, 162, 164 (FIG. 8). To move stop member 52, the operator merely lifts pins 53 and slides them, and stop member 52, into position along the path of slots 53.

To modify the disclosed label head for the production of various lengths of labels from a single strip cut by guillotine blade 46, only two adjustments are necessary. These adjustments depend on the number of columns of names and addresses printed by the computer on web 14, usually 3, 4 or 5 columns across a page, by way of example. To prepare the label head for the proper number of columns, box-like sub-assembly 86 (FIGS. 3, 10) is first pivoted counterclockwise about shaft 88, as viewed in FIG. 10, which raises pinion gear 64 out of engagement with gears 66, 68 and 70. Knob 106 is then turned to laterally transpose yoke 94, which positions gear 64 directly above either gear 66, 68 or 70. Knob 106 may, if desired, include indicating means showing the position of gear 64 as set for a 3, 4 or 5 column web 14.

When gear 64 has been properly positioned, box-like sub-assembly 86 is pivoted clockwise about shaft 88 (FIG. 10), whereby gear 64 comes into mesh with either gear 66, 68, or 70. Because each of these three gears is of a different diameter, the final angular position of box-like assembly 86 will vary depending on which of the three gears is meshing with gear 64.

The second adjustment required to cut labels of varying lengths from a single strip of web 14 cut by the guillotine blade requires alteration of the circumferential length (A to B) of rotary blade assembly 56. This is accomplished by loosening screws 208 (FIG. 5), rotating segment 202 relative to segment 200 until the proper distance A–B is achieved, and tightening screw 208. With this adjustment, rotary blade assembly 56 will cut off either 3, 4 or 5 labels from a single strip as it passes from platen 48.

The purposes of the gear change mechanism comprising gears 64, 66, 68 and 70 is to vary the cycle of guillotine blade 46. As stated previously, rotary blade assembly 56 rotates at a constant speed, and is driven directly from main power shaft 80 (FIG. 2). The number of labels cut by the rotary blade 56 depends solely on the distance A–B of the assembly surface (FIG. 5). For each stroke of guillotine blade 46, rotary blade 56 will cut the requisite number of labels. However, the timing movement of guillotine blade 56 must be synchronized with the number of labels being cut from a single strip. For example, if rotary blade 56 cuts three labels from a single strip, guillotine blade 46 must cycle once for every three rotations of blade assembly 56. If four or five labels are to be cut per strip, guillotine blade 46 must cut once for every four or five rotations of rotary blades assembly 56. Movement of pinion gear 64 adjusts the speed of shaft 38 and the cycle of guillotine blade 46 to make the proper number of cuts relative to the number of labels cut by rotary blade 56.

Those who are skilled in the art will readily perceive how the disclosed structure may be modified. Therefore, the appended claims are to be construed to cover all equivalents falling within the true scope and spirit of the invention.

We claim:

1. Apparatus for preparing address labels from a name and address list band;

said name and address band having transport means along the sides of said band;

said band including names and addresses printed in a plurality of columns across said band, and a plurality of crosswise lines of names and addresses linerally disposed on said band;

a guillotine cutting blade for cutting said band into strips, each said strip containing a single line comprising a plurality of names and addresses separated by spaces;

means associated with said transport means for incrementally advancing said band into the path of said guillotine cutting blade a distance equal to the desired height of a single label, means for trimming off said transport means after said band has moved a preselected distance;

platen means for receiving said strip after said strip has been cut from said band by said guillotine blade;

said platen including means to transport said strip away from said guillotine blade and into the path of a rotary blade assembly located adjacent one end of and at right angles to said guillotine blade;

means associated with said rotary blade assembly for capturing said strip and advancing said strip past said rotary blade assembly where said strip is cut into labels of selected length;

means for receiving said labels after said labels have been cut from said strip and applying glue to the underside of said label; and means for applying said glue-bearing label to a mailing piece;

the improvement comprising means for varying the amount of incremental advance of said band into the path of said guillotine cutting blade to vary the height of each label cut by said apparatus, said last named means including power input means, reciprocating linkage arm means driven by said power input means;

said linkage arm means removably connected to a ratchet pawl operating means including a ratchet pawl operatively connected to a ratchet drive, said ratchet drive connected to said means for incrementally advancing said band into the path of said guillotine blade;

said ratchet pawl operating means including a plurality of connecting means for said linkage arm means whereby the throw of each movement of said ratchet pawl varies depending upon which of said plurality of connecting means is used to connect said linkage arm to said ratchet pawl operating means.

2. The apparatus of claim 1 including:

eccentrically rotating linkage means driven by said power input means, said linkage arm means attached to said eccentrically rotating linkage means to impart reciprocating motion to said linkage arm.

3. The apparatus of claim 1 wherein said ratchet pawl operating means includes a plate mounted for rotation about a shaft;

said shaft connected to said means for incrementally advancing said band into the path of said guillotine blade;

said plate including a plurality of apertures, each aperture spaced at a different radial distance from said shaft;

said linkage arm means including a selectively operated fastening means adapted to be inserted in one or another of said plurality of apertures to vary the throw of said ratchet pawl.

4. The apparatus of claim 3 wherein said ratchet pawl operating means includes releasable locking pawl means preventing movement of said ratchet drive when in one position and permitting movement of said ratchet drive when in a second position;

cam surface means on said plate;

cam follower means connected to said locking pawl and adapted to be operated by said cam surface, whereby said cam surface operates said locking pawl to operate said ratchet drive means when said linkage arm reciprocates said ratchet pawl operating means.

5. Apparatus for preparing address labels from a name and address list band;

said name and address band having transport means along the sides of said band;

said band including names and addresses printed in a plurality of columns across said band, and a plurality of crosswise lines of names and addresses linerally disposed on said band;

a guillotine cutting blade for cutting said band into strips, each said strip containing a single line comprising a plurality of names and addresses separated by spaces;

means associated with said transport means for incrementally advancing said band into the path of said guillotine cutting blade a distance equal to the desired height of a single label, means for trimming off said transport means after said band has moved a preselected distance;

platen means for receiving said strip after said strip has been cut from said band by said guillotine blade;

said platen including means to transport said strip away from said guillotine blade and into the path of a rotary blade assembly located adjacent one end of and at right angles to said guillotine blade;

means associated with said rotary blade assembly for capturing said strip and advancing said strip past said rotary blade assembly where said strip is cut into labels of selected length;

means for receiving said labels after said labels have been cut from said strip and applying glue to the underside of said label; and means for applying said glue-bearing label to a mailing piece;

the improvement comprising means to reciprocally drive said guillotine blade against said platen;

said drive means including power input means operatively connected to a first shaft, said shaft mounted for rotation in a housing for said apparatus and having a plurality of gears of different diameters fixed thereon;

a box-like sub-assembly mounted for limited rotative movement about said first shaft and disposed substantially over said plurality of gears;

a second shaft mounted in said sub-assembly;

pinion gear means mounted for lateral movement on said second shaft;

said sub-assembly adapted to move from a first position wherein said pinion gear is disengaged from said plurality of gears to one of several second positions, wherein in each of said second positions said pinion gear means meshes with one of said plurality of gears;

means for selectively shifting the lateral position of said pinion gear to position said pinion gear adjacent one of said plurality of gears;

additional drive means operatively connected between said pinion gear means and an eccentrically driven shaft;

said guillotine cutting blade mounted to said eccentrically driven shaft whereby rotation of said eccentrically driven shaft reciprocally drives said guillotine cutting blade toward and away from said platen;

whereby the speed of rotation of said eccentrically driven shaft depends upon the ratio of said pinion gear and the one of said plurality of gears with which said pinion gear is in mesh.

6. The apparatus of claim 6 wherein said box-like sub-assembly includes a yoke assembly mounted for lateral movement within said sub-assembly, said yoke being adjacent to and in contact with said pinion gear means;

said yoke assembly including cam follower means forming a portion thereof; and manually operated rotatable cam means mounted on said sub-assembly and associated with said cam follower means whereby alternate rotation of said cam means reciprocally drives said yoke assembly and said pinion gear laterally relative to said sub-assembly to position said pinion gear adjacent one of said plurality of gears.

* * * * *